United States Patent
Xi et al.

(10) Patent No.: US 12,468,000 B2
(45) Date of Patent: Nov. 11, 2025

(54) METHOD FOR SEPARATING LORAN SKY AND GROUND WAVES BASED ON LEVENBERG-MARQUART ALGORITHM

(71) Applicant: XI'AN UNIVERSITY OF TECHNOLOGY, Xi'an (CN)

(72) Inventors: Xiaoli Xi, Xi'an (CN); Zhenzhu Zhao, Xi'an (CN); Jiangfan Liu, Xi'an (CN); Jinsheng Zhang, Xi'an (CN); Yanning Yuan, Xi'an (CN); Jiuxiang Gao, Xi'an (CN); Chaofan Tuo, Xi'an (CN)

(73) Assignee: XI'AN UNIVERSITY OF TECHNOLOGY, Xi'an (CN)

( * ) Notice: Subject to any disclaimer, the term of this patent is extended or adjusted under 35 U.S.C. 154(b) by 94 days.

(21) Appl. No.: 17/842,727

(22) Filed: Jun. 16, 2022

(65) Prior Publication Data
US 2022/0317228 A1 Oct. 6, 2022

(51) Int. Cl.
*G01S 1/24* (2006.01)
*G01S 1/22* (2006.01)

(52) U.S. Cl.
CPC ........ *G01S 1/24* (2013.01); *G01S 1/22* (2013.01); *G01S 1/245* (2013.01)

(58) Field of Classification Search
CPC .............. G01S 1/22; G01S 1/24; G01S 1/245
USPC .................................................. 342/388, 389
See application file for complete search history.

(56) References Cited

U.S. PATENT DOCUMENTS

| | | | |
|---|---|---|---|
| 3,858,216 A | 12/1974 | Devaul | |
| 4,325,067 A * | 4/1982 | Brodeur | G01S 1/245 342/389 |
| 4,665,404 A * | 5/1987 | Christy | G01S 11/08 342/463 |
| 4,814,771 A * | 3/1989 | Bahr | G01S 1/245 701/493 |
| 11,209,554 B2 * | 12/2021 | Crandall | G01S 5/01 |
| 11,300,647 B2 * | 4/2022 | Mason | G01S 1/0428 |
| 2021/0325549 A1 * | 10/2021 | Crandall | G01S 5/01 |
| 2023/0358841 A1 * | 11/2023 | Hershberger | G01S 1/0428 |

FOREIGN PATENT DOCUMENTS

| | | | | |
|---|---|---|---|---|
| CA | 1320255 C * | 7/1993 | | G01S 1/24 |
| CN | 108957394 A | 12/2018 | | |
| CN | 110909863 A | 3/2020 | | |
| CN | 113411141 A * | 9/2021 | | H04B 17/00 |
| CN | 116559922 A * | 8/2023 | | G01S 19/44 |
| KR | 20200007513 A * | 1/2020 | | G01S 5/10 |

* cited by examiner

*Primary Examiner* — Chuong P Nguyen

(57) ABSTRACT

Provided herein is a method for separating Loran sky and ground waves based on a Levenberg-Marquart algorithm, including: (1) collecting a plurality of Loran sky-ground wave signals followed by normalization to obtain a normalized signal; (2) preprocessing the normalized signal by inverse Fourier transform method to obtain an initialization parameter; (3) establishing a mathematical model for the Loran sky-ground wave signals in time domain; and (4) solving parameters of the mathematical model using the Levenberg-Marquart algorithm to separate the Loran sky and ground waves.

5 Claims, 3 Drawing Sheets

METHOD FOR SEPARATING LORAN SKY AND GROUND WAVES BASED ON LEVENBERG-MARQUART ALGORITHM

CROSS-REFERENCE TO RELATED APPLICATIONS

This application claims the benefit of priority from Chinese Patent Application No. 202110681189.5, filed on Jun. 18, 2021. The content of the aforementioned application, including any intervening amendments thereto, is incorporated herein by reference in its entirety.

TECHNICAL FIELD

This application relates to digital signal processing, and more specifically to a method for separating Loran sky and ground waves based on a Levenberg-Marquart algorithm.

BACKGROUND

Long-range navigation system (abbreviated as Loran) is a ground-based and low-frequency radio navigation system with strong antijamming performance and reliability, which has been used as a backup for the global navigation satellite system (GNSS) for a long time. After the information collection and processing, the primary interference in the Loran receiver signal is from the sky waves of the same source. Therefore, the sky-ground wave separation technique is crucial for the development of the Loran receiver. In recent years, the theoretical high-precision sky-ground wave separation methods mainly include: hybrid weighted Fourier transform and relaxation (Hybrid-WRELAX) and extended invariance principle weighted Fourier transform and relaxation (EXIP-WRELAX). These techniques greatly improve the separation accuracy of Loran sky and ground waves, but struggle with poor performance in a low signal-to-noise ratio. Moreover, considering that they are frequency domain algorithms, the calculation amount is positively correlated with the calculation accuracy, and when the number of signal multipaths increases, the calculation process will become extremely complicated. The Levenberg-Marquart algorithm is very effective for the parameter fitting of a nonlinear function, and introduces a damping factor based on the Gauss-Newton method, such that it not only has the optimization capability of the Gauss-Newton method, but also has reduced requirements for an initial parameter value. At the same time, the Levenberg-Marquart algorithm has a particularly strong adaptability to the function. So far, the Levenberg-Marquart algorithm has not been applied to the separation of Loran sky and ground waves.

SUMMARY

In order to achieve the high calculation accuracy in the entire range of signal-to-noise ratio, especially under a low signal-to-noise ratio, this application provides a method for separating Loran sky and ground waves based on a Levenberg-Marquart algorithm.

The technical solutions of the present disclosure are described as follows.

This application provides a method for separating Loran sky and ground waves based on a Levenberg-Marquart algorithm, comprising:

(1) generating a plurality of simulated Loran sky-ground wave signals by simulation, and collecting a plurality of actual Loran sky-ground wave signals; and normalizing the plurality of simulated Loran sky-ground wave signals and the plurality of actual Loran sky-ground wave signals to obtain a normalized signal;

(2) preprocessing the normalized signal to obtain an initialization parameter;

(3) according to the initialization parameter, establishing a mathematical model for a Loran received signal in time domain; and (4) fitting parameters in the mathematical model using the Levenberg-Marquart algorithm to obtain a Loran sky-wave time delay, a Loran sky-wave amplitude, a Loran ground-wave time delay and a Loran ground-wave amplitude.

In an embodiment, the step (1) is performed through steps of:

(1.1) generating 1000 simulated Loran sky-ground wave signals under a signal-to-noise ratio of 15 dB; wherein each of the 1000 Loran sky-ground wave signals is composed of ground wave, sky wave and noise; a time delay of the ground wave is 77 µs, and a time delay of the sky wave is 133 µs; a signal ratio of the sky wave to the ground wave is 12 dB; a sampling frequency is 1 MHz; and a single pulse repetition period of the Loran signal is 1 ms; for each Loran sky-ground wave signal, 1000 sampling points are selected, and a total sampling time is 1000 µs;

(1.2) generating 1000 simulated Loran sky-ground wave signals under a signal-to-noise ratio of 0 dB, 1000 simulated Loran sky-ground wave signals under a signal-to-noise ratio of 5 dB, 1000 simulated Loran sky-ground wave signals under a signal-to-noise ratio of 10 dB and 1000 simulated Loran sky-ground wave signals under a signal-to-noise ratio of 20 dB;

(1.3) collecting the plurality of actual Loran sky-ground wave signals with a sampling frequency of 1 MHz; wherein a single pulse repetition period of the Loran signals is 1 ms; for each of the actual received Loran signals, 1000 sampling points are selected, a total sampling time is 1000 µs; and (1.4) normalizing a signal amplitude of a total of 5000 simulated Loran sky-ground wave signals and the plurality of actual Loran sky-ground wave signals to [−1,1] to obtain the normalized signal expressed as $(t_i, y_i)$;

wherein i=1,2 . . . m; and m is equal to 1000, and represents the number of samples for a single signal.

In an embodiment, in step (2), the normalized signal is preprocessed by inverse Fourier transform method; and the initialization parameter comprises: the number of signal multipaths, an initial time delay and an initial amplitude of each multipath signal.

In an embodiment, in step (3), considering that a Loran signal transmission process only experiences amplitude and delay changes, the mathematical model is established in the time domain according to the number of signal multipaths, expressed as:

$$y(t) = \sum_{n=1}^{N} a_n q(t - \tau_n); \text{ and} \quad (1)$$

$$q(t) = t^2 \sin(0.2\pi t)\exp(-2t/65); \quad (2)$$

wherein y(t) is a certain signal sample; q(t) is a standard enhanced Loran signal; t is time, in µs; $\alpha_n$ is a normalized amplitude of a $n^{th}$ multipath signal; $\tau_n$ is a time delay of the $n^{th}$ multipath signal, in µs; N is the number of signal multipaths; for the plurality of simulated Loran sky-ground wave signals, N is equal to 2; and for the plurality of actual Loran sky-ground wave signals, N is equal to 5.

In an embodiment, in step (4), a nonlinear equation (1) is solved using the Levenberg-Marquart algorithm, wherein there are 2n parameters to be solved $\alpha_1, \alpha_2, \ldots, \alpha_n; \tau_1, \tau_2, \ldots, \tau_n$; let $x=[\alpha_1, \alpha_2, \ldots, \alpha_n; \tau_1, \tau_2, \ldots, \tau_n]=[x_1, x_2, \ldots, x_{2n}]$; a model function is expressed as $\varphi(x; t)$; a residual r(x) is expressed as:

$$r(x)=[r_1(x), r_2(x), \ldots r_m(x)] \quad (3); \text{ and}$$

$$r_i(x)=\varphi(t_i, x)-y_i, i=1, \ldots, m \quad (4).$$

an objective function of the Levenberg-Marquardt algorithm is expressed as:

$$f(x) = \frac{1}{2}r(x)^T r(x) = \frac{1}{2}\sum_{i=1}^{m}[r_i(x)]^2; \quad (5)$$

according to a principle of least squares, when solving parameters of the objective function to be fitted, it is necessary to make a residual sum of squares be a minimum value:

$$\min f(x) \quad (6);$$

through the Levenberg-Marquart algorithm, multiple iterations are performed to make the parameters to be fitted infinitely approach optimal parameters of the min f(x); and an iteration incremental equation is expressed as:

$$x_{k+1}=x_k-(h+\lambda I)^{-1}g \quad (7);$$

wherein k represents the current number of iterations; $\lambda$ is a damping coefficient; I is an identity matrix; $h(x_k)=J(x_k)^T J(x_k)$, $g(x_k)=J(x_k)^T r(x_k)$, $J(x_k)$ is a jacobi matrix of $r(x_k)$, expressed as:

$$J(x_k) = \begin{bmatrix} \frac{\partial r_1}{\partial x_1} & \cdots & \frac{\partial r_1}{\partial x_{2n}} \\ \vdots & \ddots & \vdots \\ \frac{\partial r_m}{\partial x_1} & \cdots & \frac{\partial r_m}{\partial x_{2n}} \end{bmatrix}_{x_k} ; \quad (8)$$

the step (4) is performed through steps of:
(4.1) according to the initialization parameter obtained in step (2), setting an initial point $x_k=x_0$, and setting the damping coefficient $\lambda$ to be greater than 1, and a convergence accuracy $\epsilon$ to be greater than 0;
(4.2) calculating $r(x_k)$ and $f(x_k)$;
(4.3) calculating $J(x_k)$, $h(x_k)$ and $g(x_k)$;
(4.4) solving the incremental equation $(h(x_k)+\lambda I)\Delta x_k=g(x_k)$ to obtain an increment $\Delta x_k$;
(4.5) letting $x_{k+1}=x_k+\Delta x_k$, and calculating $f(x_{k+1})$;
(4.6) if $\|\Delta x_k\|_2 < \epsilon$, ending iterations;
otherwise, proceeding to step (4.7);
(4.7) if $f(x_{k+1}) < f(x_k)+\beta g^T \Delta x_k$, letting $\lambda=\lambda/v$, and proceeding to step (4.8);
otherwise, letting $\lambda=\lambda v$, and repeating steps (4.4)-(4.7); wherein $\beta, v$ are constraint variables; and
(4.8) letting k=k+1, repeating steps (4.2)-(4.8);
wherein $\beta=0$, $v=2$, $\lambda=2$, and $\epsilon=10^{-4}$.

Compared to the prior art, the present disclosure has the following beneficial effects.

The present disclosure provides a method for separating Loran sky and ground waves based on a Levenberg-Marquart algorithm, which directly performs a mathematical model for the enhanced Loran sky-ground wave signal in the time domain, and converts it into a nonlinear equation parameter optimization problem, which is simple, clear and convenient to be implemented by the hardware; and significantly improves the accuracy in the entire signal-to-noise ratio, especially in a low signal-to-noise ratio.

DETAILED DESCRIPTION OF EMBODIMENTS

Figure 1:
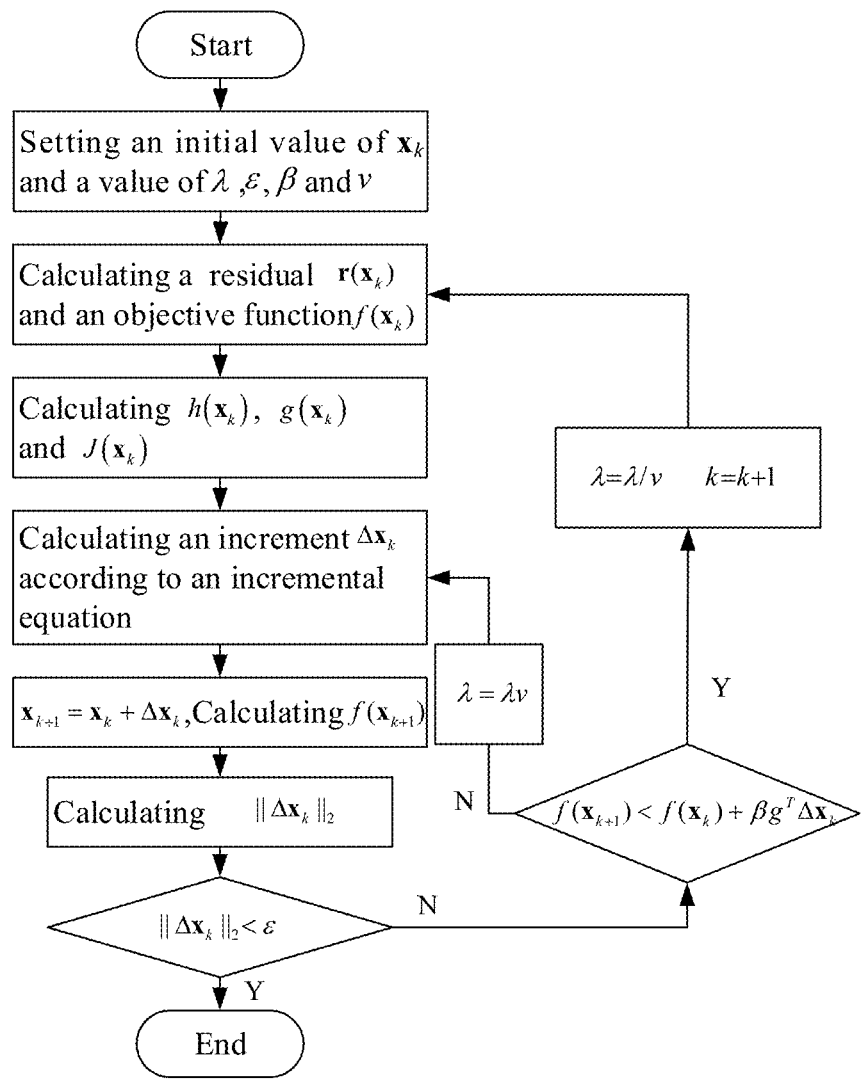
FIG. 1 is a flow chart of a Levenberg-Marquart algorithm according to an embodiment of the present disclosure.
Figure 2:
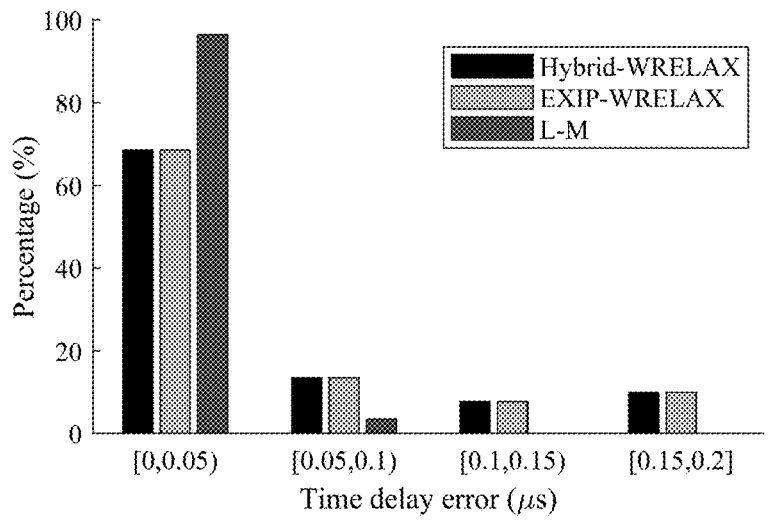
FIG. 2a is a histogram illustrating performance comparison of algorithms under simulated signals in step (1.1)
FIG. 2b illustrates performance comparison of algorithms under different signal-to-noise ratios in step (1.2); where a statistical average of 1000 groups of data errors is taken as the delay error.
FIG. 2c is a histogram showing performance comparison of algorithms under a signal-to-noise ratio of 0 dB in step (1.2); where the Levenberg-Marquart algorithm is represented by L-M.
Figure 2:
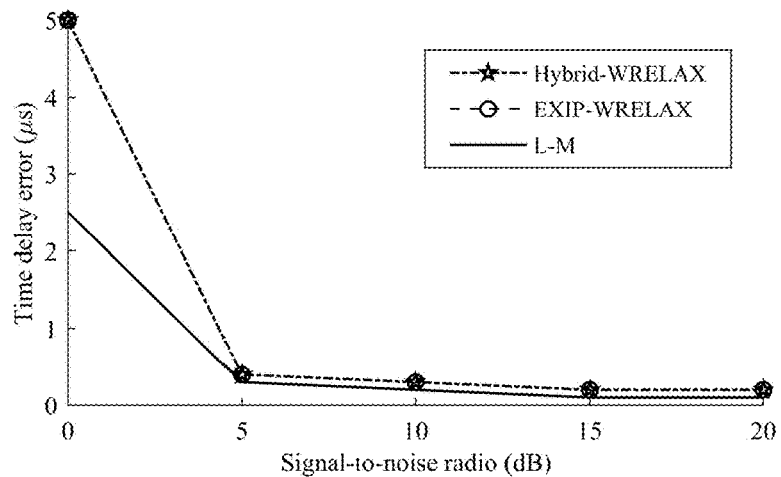
Figure 2:
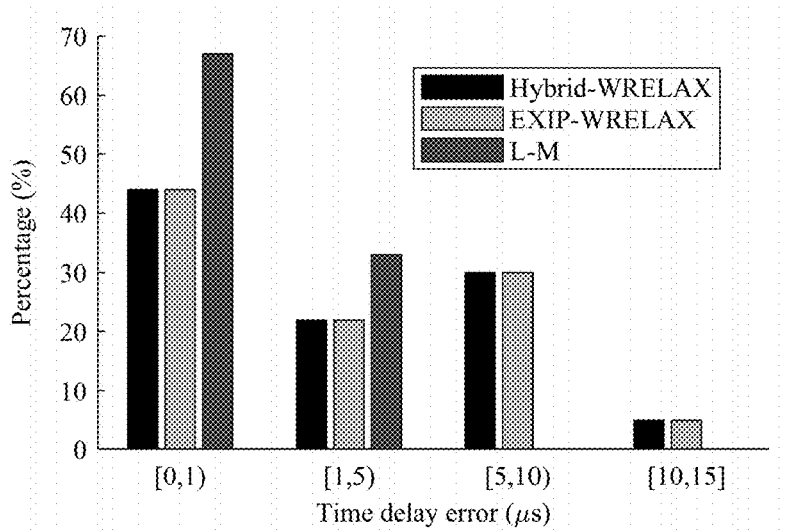
Figure 3:
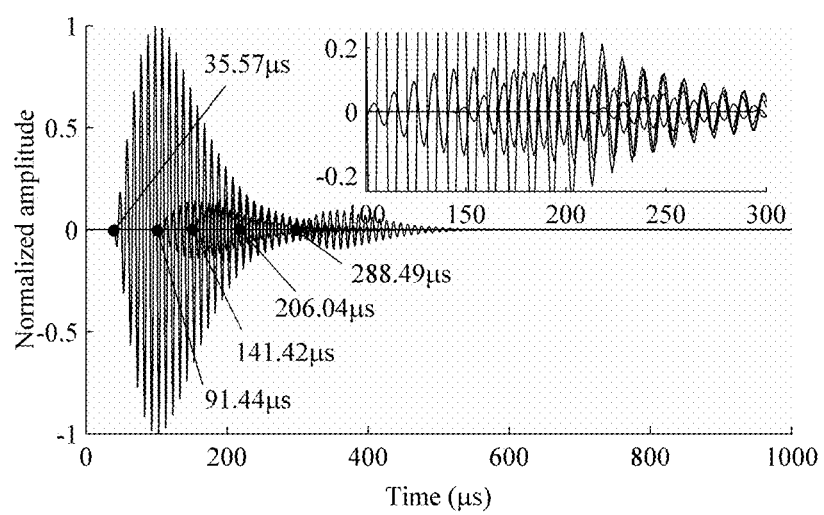
FIG. 3 shows separation results of actual signals acquired in step (1.3).

The present disclosure will be described completely and clearly below with reference to the accompanying drawings and embodiments to make the object, technical solutions, and beneficial effects of the present disclosure clearer.

Provided herein is a method for separating Loran sky and ground waves based on a Levenberg-Marquart algorithm, which is performed through the following steps.

(1) A plurality of simulated Loran sky-ground wave signals are generated by simulation, and a plurality of actual Loran sky-ground wave signals are collected. The plurality of simulated Loran sky-ground wave signals and the plurality of actual Loran sky-ground wave signals are normalized to obtain a normalized signal.

(1.1) 1000 simulated Loran sky-ground wave signals are generated under a signal-to-noise ratio of 15 dB.

Each of the 1000 Loran sky-ground wave signals is composed of ground wave, sky wave and noise. A time delay of the ground wave is 77 μs, and a time delay of the sky wave is 133 μs. A signal ratio of the sky wave to the ground wave is 12 dB. A sampling frequency is 1 MHz. A single pulse repetition period of the Loran signals is 1 ms. For each Loran sky-ground wave signal, 1000 sampling points are selected, and a total sampling time is 1000 μs.

(1.2) 1000 simulated Loran sky-ground wave signals are generated under a signal-to-noise ratio of 0 dB. 1000 simulated Loran sky-ground wave signals are generated under a signal-to-noise ratio of 5 dB. 1000 simulated Loran sky-ground wave signals are generated under a signal-to-noise ratio of 10 dB. 1000 simulated Loran sky-ground wave signals are generated under a signal-to-noise ratio of 20 dB.

(1.3) The plurality of actual Loran sky-ground wave signals are collected with a sampling frequency of 1 MHz. A single pulse repetition period of actual Loran signals is 1 ms. For each of the actual received Loran signals, 1000 sampling points are selected, and a total sampling time is 1000 μs.

(1.4) A signal amplitude of a total of 5000 simulated Loran sky-ground wave signals and the plurality of actual Loran sky-ground wave signals is normalized to [−1,1] to obtain the normalized signal expressed as $(t_i, y_i)$; where i=1, 2 . . . m; and m is equal to 1000, and represents the number of samples for a single signal.

(2) The normalized signal is preprocessed by inverse Fourier transform method. An initialization parameter includes: the number of signal multipaths, an initial time delay and an initial amplitude of each multipath signal.

(3) Considering that a Loran signal transmission process only experiences amplitude and delay changes, a mathematical model for the plurality groups of Loran sky-ground wave signals is established in a time domain according to the number of signal multipaths, expressed as:

$$y(t) = \sum_{n=1}^{N} a_n q(t - \tau_n); \text{ and} \quad (1)$$

$$q(t) = t^2 \sin(0.2\pi t)\exp(-2t/65); \quad (2)$$

where y(t) is a certain signal sample; q(t) is a standard enhanced Loran signal; t is time, in µs; $\alpha_n$ is a normalized amplitude of the $n^{th}$ multipath signal; $\tau_n$ is a time delay of the $n^{th}$ multipath signal, in µs; N is the number of signal multipaths; for the plurality of simulated Loran sky-ground wave signals, N is equal to 2; and for the plurality of actual Loran sky-ground wave signals, N is equal to 5.

(4) A nonlinear equation (1) is solved using the Levenberg-Marquart algorithm. There are 2n parameters to be solved $\alpha_1, \alpha_2, \ldots, \alpha_n; \tau_1, \tau_2, \ldots, \tau_n$. let $x=[\alpha_1, \alpha_2, \ldots, \alpha_n; \tau_1, \tau_2, \ldots, \tau_n]=[x_1, x_2, \ldots, x_{2n}]$. A model function is expressed as $\varphi(x; t)$. A residual r(x) is expressed as:

$$r(x)=[r_1(x), r_2(x), \ldots r_m(x)] \quad (3); \text{ and}$$

$$r_i(x)=\varphi(t_i, x)-y_i, i=1, \ldots, m \quad (4).$$

An objective function of the Levenberg-Marquardt algorithm is expressed as:

$$f(x) = \frac{1}{2} r(x)^T r(x) = \frac{1}{2} \sum_{i=1}^{m} [r_i(x)]^2. \quad (5)$$

According to the principle of least squares, when solving parameters of the objective function to be fitted, it is necessary to make a residual sum of squares be a minimum value:

$$\min f(x) \quad (6).$$

Through the Levenberg-Marquart algorithm, multiple iterations are performed to make the parameters to be fitted infinitely approach optimal parameters, which make the min f (x). An iteration incremental equation of an iteration is expressed as:

$$x_{k+1}=x_k-(h+\lambda I)^{-1}g \quad (7);$$

where k represents the current number of iterations; $\lambda$ is a damping coefficient; I is an identity matrix; $h(x_k)=J(x_k)^T J(x_k)$, $g(x_k)=J(x_k)^T r(x_k)$, $J(x_k)$ is a Jacobi matrix of $r(x_k)$, expressed as:

$$J(x_k) = \begin{bmatrix} \frac{\partial r_1}{\partial x_1} & \cdots & \frac{\partial r_1}{\partial x_{2n}} \\ \vdots & \ddots & \vdots \\ \frac{\partial r_m}{\partial x_1} & \cdots & \frac{\partial r_m}{\partial x_{2n}} \end{bmatrix}_{x_k}. \quad (8)$$

The step (4) is performed as follows.

(4.1) According to the initialization parameter obtained in step (2), an initial point $x_k$ is set as $x_0$; the damping coefficient $\lambda$ is set to be greater than 1; and a convergence accuracy $\epsilon$ is set to be greater than 0.

(4.2) $r(x_k)$ and $f(x_k)$ are calculated.

(4.3) $J(x_k)$, $h(x_k)$ and $g(x_k)$ re calculated.

(4.4) The incremental equation $(h(x_k)+\lambda I)\Delta x_k=g(x_k)$ is solved to obtain an increment $\Delta x_k$.

(4.5) Let $x_{k+1}=x_k+\Delta x_k$, and $f(x_{k+1})$ is calculated.

(4.6) If $\|\Delta x_k\|_2 < \epsilon$, iterations are ended; otherwise, step (4.7) is proceeded.

(4.7) If $f(x_{k+1}) < f(x_k) + \beta g^T \Delta_k$, let $\lambda=\lambda/v$, step (4.8) is proceeded; otherwise, let $\lambda=\lambda v$, and steps (4.4)-(4.7) are repeated, where β,v are constraint variables.

(4.8) Let k=k+1, and steps (4.2)-(4.8) are repeated, where β=0, v=2, λ=2, and $\epsilon=10^{-4}$.

What is claimed is:

1. A method for separating Loran sky and ground waves based on a Levenberg-Marquart algorithm, the method comprising:
   (1) generating, by a LORAN signal simulator of a Long-range navigation system, a plurality of simulated Loran sky-ground wave signals, and collecting, by a LORAN receiver of the Long-range navigation system, a plurality of actual Loran sky-ground wave signals; and normalizing, by the LORAN receiver, the plurality of simulated Loran sky-ground wave signals and the plurality of actual Loran sky-ground wave signals to obtain a normalized signal;
   (2) preprocessing, by the LORAN receiver, the normalized signal to obtain an initialization parameter;
   (3) according to the initialization parameter, establishing, by the LORAN receiver, a mathematical model for a Loran received signal in time domain; and
   (4) fitting, by the LORAN receiver, parameters in the mathematical model using the Levenberg-Marquart algorithm to obtain a Loran sky-wave time delay, a Loran sky-wave amplitude, a Loran ground-wave time delay, and a Loran ground-wave amplitude;
   separating, by the LORAN receiver, Loran sky waves and Loran ground waves in the Loran received signal according to the Loran sky-wave time delay, the Loran sky-wave amplitude, the Loran ground-wave time delay, and the Loran ground-wave amplitude; and
   providing, by the LORAN receiver, positioning for the Long-range navigation system based on the separated Loran ground waves.

2. The method of claim 1, wherein the step (1) is performed through steps of:
   (1.1) generating, by the LORAN signal simulator, 1000 simulated Loran sky-ground wave signals under a signal-to-noise ratio of 15 dB;
   wherein each of the 1000 Loran sky-ground wave signals is composed of a ground wave, a sky wave, and a noise; a time delay of the ground wave is 77 µs, and a time delay of the sky wave is 133 µs; a signal ratio of the sky wave to the ground wave is 12 dB; a sampling frequency is 1 MHz; and a single pulse repetition period of the simulated Loran sky-ground wave signals is 1 ms; for each of the Loran sky-ground wave signal, 1000 sampling points are selected, and a total sampling time is 1000 μs;

(1.2) generating, by the LORAN signal simulator, 1000 simulated Loran sky-ground wave signals under a signal-to-noise ratio of 0 dB, 1000 simulated Loran sky-ground wave signals under a signal-to-noise ratio of 5 dB, 1000 simulated Loran sky-ground wave signals under a signal-to-noise ratio of 10 dB and 1000 simulated Loran sky-ground wave signals under a signal-to-noise ratio of 20 dB;

(1.3) collecting, by the LORAN receiver, the plurality of actual Loran sky-ground wave signals with a sampling frequency of 1 MHz; wherein a single pulse repetition period of each of the plurality of actual Loran sky-ground wave signals is 1 ms; for each of the plurality of actual Loran sky-ground wave signals, 1000 sampling points are selected, and a total sampling time is 1000 μs; and (1.4) normalizing, by the LORAN receiver, a signal amplitude of a total of 5000 simulated Loran sky-ground wave signals and the plurality of actual Loran sky-ground wave signals to [−1,1] to obtain the normalized signal expressed as $(t_i, y_i)$;

wherein i=1,2 . . . m; and m is equal to 1000, and represents the number of samples for a single signal.

3. The method of claim 1, wherein in step (2), the normalized signal is preprocessed by inverse Fourier transform method; and the initialization parameter comprises: a number of signal multipaths, an initial time delay, and an initial amplitude of each multipath signal.

4. The method of claim 3, wherein in step (3), considering that a Loran signal transmission process only experiences amplitude and delay changes, the mathematical model is established in the time domain according to the number of signal multipaths, expressed as:

$$y(t) = \sum_{n=1}^{N} a_n q(t - \tau_n); \text{ and} \tag{1}$$

$$q(t) = t^2 \sin(0.2\pi t)\exp(-2t/65); \tag{2}$$

wherein y(t) is a certain signal sample; q(t) is a standard enhanced Loran signal; t is time, in μs; $a_n$ is a normalized amplitude of a $n^{th}$ multipath signal; $\tau_n$ is a time delay of the $n^{th}$ multipath signal, in μs; N is the number of signal multipaths; for the plurality of simulated Loran sky-ground wave signals, N is equal to 2; and for the plurality of actual Loran sky-ground wave signals, N is equal to 5.

5. The method of claim 4, wherein in step (4), a nonlinear equation (1) is solved using the Levenberg-Marquart algorithm, wherein there are 2n parameters to be solved $\alpha_1$, $\alpha_2, \ldots, \alpha_n; \tau_1, \tau_2, \ldots, \tau_n$; let $x=[\alpha_1, \alpha_2, \ldots, \alpha_n; \tau_1, \tau_2, \ldots, \tau_n]=[x_1, x_2, \ldots, x_{2n}]$; a model function is expressed as φ(x; t); a residual r(x) is expressed as:

$$r(x)=[r_1(x), r_2(x), \ldots r_m(x)] \tag{3); and}$$

$$r_i(x)=\varphi(t_i, x)-y_i, i=1, \ldots, m \tag{4}$$

an objective function of the Levenberg-Marquardt algorithm is expressed as:

$$f(x) = \frac{1}{2}r(x)^T r(x) = \frac{1}{2}\sum_{i=1}^{m}[r_i(x)]^2; \tag{5}$$

according to a principle of least squares, when solving parameters of the objective function to be fitted, it is necessary to make a residual sum of squares be a minimum value:

$$\min f(x) \tag{6};$$

through the Levenberg-Marquart algorithm, multiple iterations are performed to make the parameters to be fitted infinitely approach optimal parameters making the min f(x); and an iteration incremental equation is expressed as:

$$x_{k+1}=x_k-(h+\lambda I)^{-1}g \tag{7};$$

wherein k represents a current number of iterations; λ is a damping coefficient; I is an identity matrix; $h(x_k)=J(x_k)^T J(x_k)$, $g(x_k)=J(x_k)^T r(x_k)$, $J(x_k)$ is a Jacobi matrix of $r(x_k)$, expressed as:

$$J(x_k) = \begin{bmatrix} \frac{\partial r_1}{\partial x_1} & \cdots & \frac{\partial r_1}{\partial x_{2n}} \\ \vdots & \ddots & \vdots \\ \frac{\partial r_m}{\partial x_1} & \cdots & \frac{\partial r_m}{\partial x_{2n}} \end{bmatrix}_{x_k}; \tag{8}$$

the step (4) is performed through steps of:

(4.1) according to the initialization parameter obtained in step (2), setting an initial point $x_k=x_0$, and setting the damping coefficient λ to be greater than 1, and a convergence accuracy ϵ to be greater than 0;

(4.2) calculating $r(x_k)$ and $f(x_k)$;

(4.3) calculating $J(x_k)$, $h(x_k)$ and $g(x_k)$;

(4.4) solving an incremental equation $(h(x_k)+\lambda I)\Delta x_k=g(x_k)$ to obtain an increment $\Delta x_k$;

(4.5) letting $x_{k+1}=x_k+\Delta x_k$, and calculating $f(x_{k+1})$;

(4.6) if $\|\Delta x_k\|_2 < \epsilon$, ending iterations; otherwise, proceeding to step (4.7);

(4.7) if $f(x_{k+1}) < f(x_k) + \beta g^T \Delta x_k$, letting λ=λ/v, and proceeding to step (4.8);

otherwise, letting λ=λv, repeating steps (4.4)-(4.7);

wherein β,v are constraint variables; and (4.8) letting k=k+1, repeating steps (4.2)-(4.8);

wherein β=0, v=2, λ=2, and $\epsilon=10^{-4}$.

* * * * *